United States Patent
Lee et al.

(10) Patent No.: US 11,500,437 B2
(45) Date of Patent: Nov. 15, 2022

(54) POWER SUPPLY DEVICE FOR DISPLAY DEVICE BY A WIRED OR WIRELESS MANNER, DISPLAY SYSTEM INCLUDING SAME, AND POWER SELECTION METHOD FOR POWER SUPPLY DEVICE

(71) Applicant: SAMSUNG ELECTRONICS CO., LTD., Suwon-si (KR)

(72) Inventors: Sang-hoon Lee, Suwon-si (KR); Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 16/492,253

(22) PCT Filed: Jan. 23, 2018

(86) PCT No.: PCT/KR2018/001005
§ 371 (c)(1),
(2) Date: Sep. 9, 2019

(87) PCT Pub. No.: WO2018/169200
PCT Pub. Date: Sep. 20, 2018

(65) Prior Publication Data
US 2021/0200288 A1 Jul. 1, 2021

(30) Foreign Application Priority Data
Mar. 13, 2017 (KR) .......................... 10-2017-0031043

(51) Int. Cl.
*G06F 1/26* (2006.01)
*H02J 50/12* (2016.01)
(Continued)

(52) U.S. Cl.
CPC .............. *G06F 1/263* (2013.01); *G06F 1/28* (2013.01); *G06F 3/16* (2013.01); *H02J 50/12* (2016.02)

(58) Field of Classification Search
None
See application file for complete search history.

(56) References Cited

U.S. PATENT DOCUMENTS 8,656,193 B2 2/2014 Hijazi et al.
8,729,734 B2 5/2014 Cook et al.
(Continued)

FOREIGN PATENT DOCUMENTS

JP 2011-139589 7/2011
JP 5513682 6/2014
(Continued)

OTHER PUBLICATIONS

International Search Report for PCT/KR2018/001005 with English translation, dated May 18, 2018, 5 pages.
(Continued)

*Primary Examiner* — Danny Chan
(74) *Attorney, Agent, or Firm* — Nixon & Vanderhye, P.C.

(57) ABSTRACT

A power supply device and a display system including the same are provided. A power supply device according to the disclosure is disposed so as to be spaced apart from a display device and supplies power to the display device, and includes a first power supplier which supplies power to the display device through a cable in a wired manner, a second power supplier which supplies power to the display device in a wireless manner, a detector for detecting whether the power supply device is connected to the display device through the cable, and a processor configured to control the second power supplier in a state in which the display device
(Continued)

and the power supply device are disconnected, such that power is supplied in the wireless manner, and control the first power supplier based on detecting connection between the display device and the power supply device, such that power is supplied in the wired manner.

12 Claims, 14 Drawing Sheets

(51) Int. Cl.
*G06F 1/28* (2006.01)
*G06F 3/16* (2006.01)

(56) References Cited

U.S. PATENT DOCUMENTS

| | | | |
|---|---|---|---|
| 9,093,856 B2 | 7/2015 | Han et al. | |
| 9,356,476 B2 | 5/2016 | Yu et al. | |
| 9,966,188 B2 | 5/2018 | Cook et al. | |
| 10,199,872 B2 | 2/2019 | Jung et al. | |
| 2011/0248575 A1 | 10/2011 | Kim et al. | |
| 2011/0267135 A1* | 11/2011 | Chen | G06F 1/266 327/518 |
| 2012/0229084 A1* | 9/2012 | Gu | H02J 7/025 320/108 |
| 2013/0113421 A1* | 5/2013 | Han | H02J 7/0042 320/108 |
| 2013/0285601 A1* | 10/2013 | Sookprasong | H02J 7/02 320/108 |
| 2014/0184171 A1 | 7/2014 | Lee et al. | |
| 2014/0203661 A1* | 7/2014 | Dayan | G06F 1/26 307/104 |
| 2015/0194839 A1* | 7/2015 | Wojcik | H01M 10/425 320/108 |
| 2015/0303704 A1* | 10/2015 | Juan | H02J 50/90 320/108 |
| 2016/0077562 A1* | 3/2016 | Smith | G06F 1/263 713/310 |
| 2016/0156873 A1* | 6/2016 | Toye | H04N 5/64 348/453 |
| 2017/0054328 A1* | 2/2017 | Jung | H02J 50/10 |
| 2017/0108910 A1* | 4/2017 | Goh | G06F 13/385 |
| 2018/0063575 A1* | 3/2018 | Lee | G09G 5/006 |
| 2018/0115179 A1* | 4/2018 | Fan | H02J 50/10 |

FOREIGN PATENT DOCUMENTS

| | | |
|---|---|---|
| KR | 10-2011-0112917 | 10/2011 |
| KR | 10-2013-0048982 | 5/2013 |
| KR | 10-1391086 | 4/2014 |
| KR | 10-2014-0086000 | 7/2014 |
| KR | 10-2016-0127982 | 11/2016 |
| KR | 10-2017-0022115 | 3/2017 |

OTHER PUBLICATIONS

Written Opinion of the ISA for PCT/KR2018/001005 with English translation, dated May 18, 2018, 17 pages.

* cited by examiner

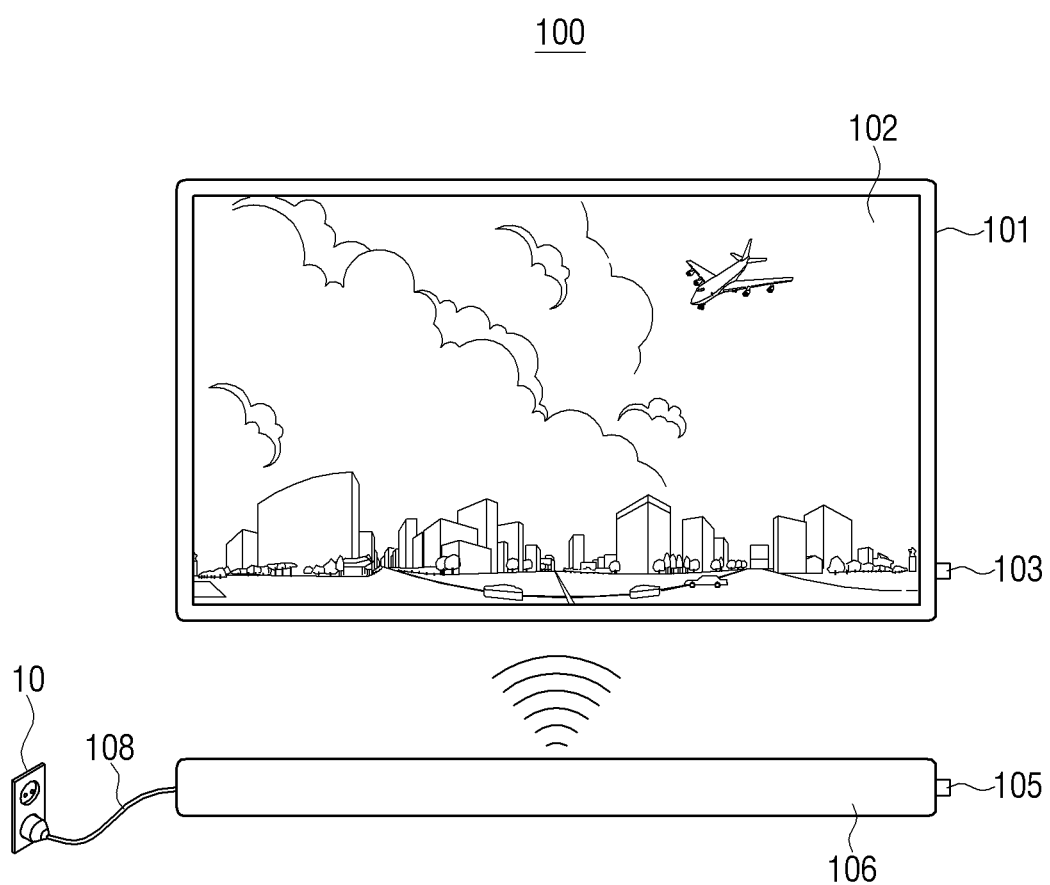

FIG. 6
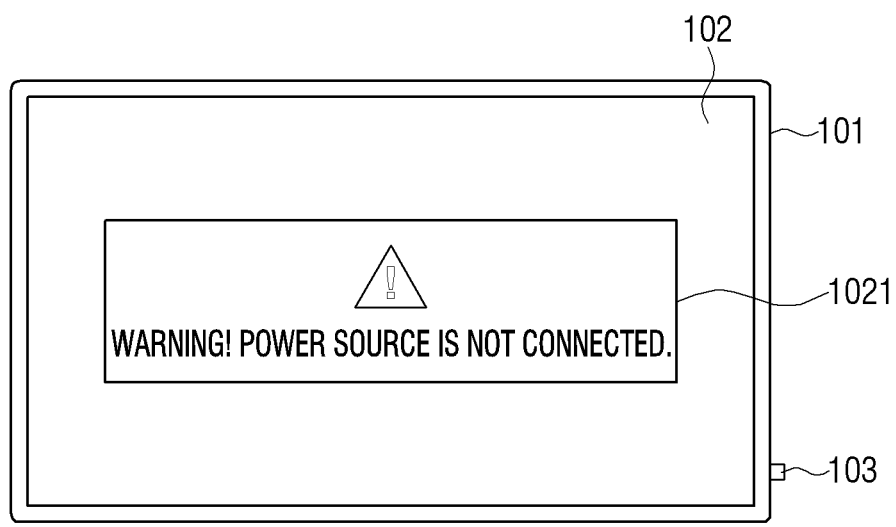
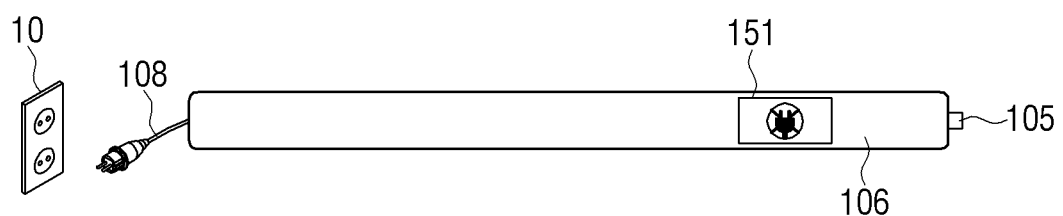

FIG. 7
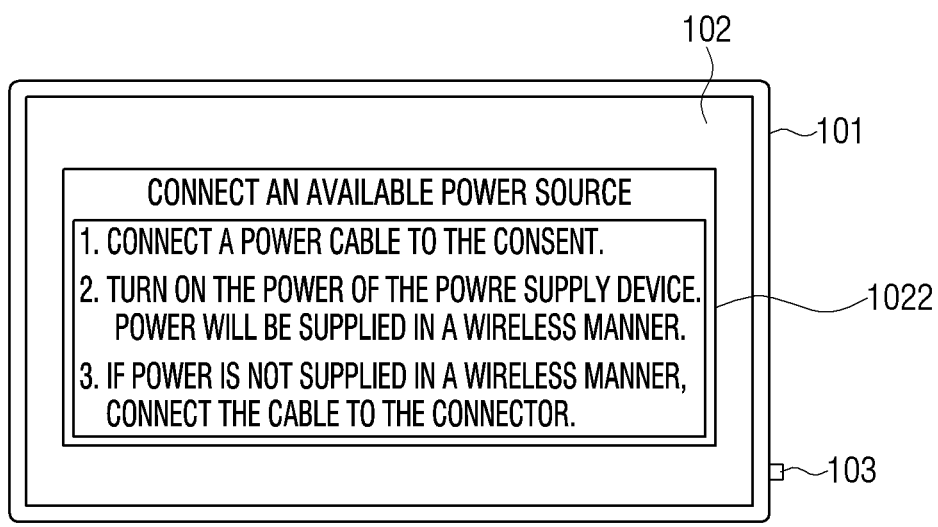

300

POWER SUPPLY DEVICE FOR DISPLAY DEVICE BY A WIRED OR WIRELESS MANNER, DISPLAY SYSTEM INCLUDING SAME, AND POWER SELECTION METHOD FOR POWER SUPPLY DEVICE

This application is the U.S. national phase of International Application No. PCT/KR2018/001005 filed 23 Jan. 2018, which designated the U.S. and claims priority to KR Patent Application No. 10-2017-0031043 filed 13 Mar. 2017, the entire contents of each of which are hereby incorporated by reference.

FIELD

The disclosure relates to a power supply device using a wireless power transmission technology, a display system including the same, and a power selection method for a power supply device, and more particularly, to a power supply device that can supply power to a display device in a wired or wireless manner by selection of a user, a display system including the same, and a power selection method for a power supply device.

DESCRIPTION OF RELATED ART

A conventional wireless power transmission device and a conventional display device using the same transmitted and received power between each other by using a magnetic coupling or magnetic resonance coupling logic. Accordingly, separation distance between a display device and a wireless power transmission device was an important element influencing the efficiency of wireless power transmission, and in general, a wireless power transmission device and a display device are disposed to be close to each other within a specific range of distance, and accordingly, the efficiency of wireless power transmission was maintained to be constant.

Here, in case a display device is a stand type instead of a wall hanging type, a stand for supporting the display device was integrally formed with the display device. Also, it was general that a wireless power transmission device was disposed in the lower part of the stand.

However, in case a display device was a stand type as above, a separate stand was integrally formed with the display device even though a wireless power transmission device could be used as a stand for supporting the display device, and thus there was a disadvantage that the overall manufacturing cost of the display device was increased. Also, in case a separate stand was integrally formed with a display device, there was a problem that, if a wireless power transmission device was disposed in the lower part of a stand for supporting the display device, the stand integrally formed with the display device performed a role of a shield, and accordingly, the efficiency of wireless power transmission was degraded.

Other than the above, there were many cases where a wireless power transmission device was designed and manufactured together with a display device, and the wireless power transmission device and the display device gave a feeling of unified aesthetics to consumers. In such a case, even in the case of a display device in a wall hanging type, there was a demand from consumers for arranging a wireless power transmission device near the display device according to individual preference, and using the wireless power transmission device as a stand for supporting the display device.

Further, in the case of using a wireless power transmission device as a stand for supporting a display device, the display device and the wireless power transmission device were disposed in a close distance wherein they could be connected to each other by wire, and thus there was no need to use wireless power transmission of which power transmission efficiency is lower than wired power transmission.

In such a case, a conventional wireless power transmission device and a conventional display device using the same could not easily convert a wireless power transmission method into a wired power transmission method. Also, in case wired connection between a display device and a power supply device was disconnected due to a user's mistake or a defect in the product itself, a conventional display device did not display a UI informing the user that power is not supplied or a UI guiding the user about power connection after detecting the disconnection.

SUMMARY

The disclosure is for addressing the aforementioned problems, and the purpose of the disclosure is in providing a power supply device that can identify whether a display device and the power supply device is connected by wire, and supply power to the display device by a wired or wireless method, a display system including the same, and a power selection method for the power supply device.

For achieving the aforementioned purpose, a power supply device according to an embodiment of the disclosure is disposed so as to be spaced apart from a display device and supplies power to the display device, and includes a first power supplier which supplies power to the display device through a cable in a wired manner, a second power supplier which supplies power to the display device in a wireless manner, a detector for detecting whether the power supply device is connected to the display device through the cable, and a processor configured to control the second power supplier in a state in which the display device and the power supply device are disconnected, such that power is supplied in the wireless manner, and control the first power supplier based on detecting connection between the display device and the power supply device, such that power is supplied in the wired manner.

Also, the power supply device may include a closed loop line which, based on being connected to the cable, electronically connects two lines included in the cable. Meanwhile, the detector may transmit a signal to one line between the two lines connected to the closed loop line according to control of the processor, and detect whether the display device and the power supply device are connected according to whether the transmitted signal is received through the other line of the cable.

In addition, the detector may receive connection information through the closed loop line which is disposed on the display device and is electronically connected to the two lines included in the cable, and detect whether the display device and the power supply device are connected based on the received connection information.

Meanwhile, the connection information may include a signal that the processor transmits to one line between the two lines connected to the closed loop line by controlling the detector and a signal received at the detector via the closed loop line. Also, the processor may, based on a signal received at the detector via the closed loop line being present, control the first and second power suppliers to supply power to the display device in the wired manner and stop supply of power in the wireless manner.

In addition, the processor may, based on the power supply device not being connected to an external power source or the display device failing to receive power from the power supply device in a wired or wireless manner, control a display panel to display a UI informing that a power source is not connected or a UI guiding connection to a power source.

For achieving the aforementioned purpose, the disclosure provides a display system including a main body on which a display panel is mounted, a power supply device including a wired power supply module providing power to the main body in a wired manner and a wireless power supply module providing power to the main body in a wireless manner, a detector for detecting whether the power supply device is connected to the main body through a cable, and a processor configured to control the wireless power supply module in a state in which the main body and the power supply device are disconnected, such that power is supplied to the main body in a wireless manner, and control the wired power supply module based on detecting connection between the main body and the power supply device, such that power is supplied in a wired manner.

The display system may include a first connector formed on the power supply device and a second connecter formed on the main body, and both ends of the cable may be respectively connected to the first and second connectors.

Also, the second connector may include a closed loop line which, based on being connected to the cable, electronically connects two lines included in the cable. Meanwhile, the processor may determine whether the main body and the power supply device are connected by controlling the detector to transmit a signal to one line between the two lines connected to the closed loop line, and detect whether the signal is received at the detector through the other line of the cable.

In addition, the display system may include a support for supporting the main body, and both ends of the support may be separably connected to the main body and the power supply device, respectively.

Also, the support may be slide-coupled, screw-coupled, or snap-coupled to each of the main body and the power supply device.

Meanwhile, the processor may, based on the power supply device not being connected to an external power source or the main body failing to receive power from the power supply device in a wired or wireless manner, control the display panel to display a UI informing that a power source is not connected or a UI guiding connection to a power source.

Also, the power supply device may include an auxiliary display formed on one surface of the power supply device, and the auxiliary display may, based on the power supply device not being connected to an external power source or the main body failing to receive power from the power supply device in a wired or wireless manner, display a warning icon.

In addition, the power supply device may include a speaker formed on one surface of the power supply device, and the processor may, based on the power supply device not being connected to an external power source or the main body failing to receive power from the power supply device in a wired or wireless manner, control the speaker to output a warning sound or a voice sound guiding connection to a power source.

Meanwhile, the display system may further include a reserve power supplier which is capable of, in a state in which the power supply device is not connected to an external power source, supplying power to the power supply device and the main body.

For achieving the aforementioned purpose, the disclosure provides a power supply method for supplying power to a display system including the steps of supplying power to the display system wirelessly, identifying whether the display system and the power supply device are connected through a cable, and based on identifying that the display system and the power supply device are connected through a cable, supplying power by the power supply device to the display system by wire.

Meanwhile, the step of identifying may include the steps of transmitting a signal to a first line of the cable connected to a first terminal of the closed loop line disposed on the display system, and determining whether the signal was received through a second line of the cable connected to a second connector of the closed loop line.

Also, the signal may be a voltage signal, and the step of determining whether the signal was received may be a step of determining whether a voltage received through the second line is higher than a predetermined voltage.

Meanwhile, the power supply method may further include the step of, after the step of determining whether the signal was received, based on the signal not being received through the second line, displaying through a display panel a UI informing that connection to a power source was not performed or a UI guiding connection to a power source.

Also, the power supply method may include the step of, prior to the step of supplying power to the display system wirelessly, identifying whether the power supply device is connected to an external power source by wire, and the step of, based on identifying that the power supply device is not connected to the external power source by wire, supplying power by a reserve power supplier to the power supply device and the display system.

In addition, the power supply method may further include the step of, after the step of identifying whether the power supply device is connected to an external power source by wire, based on identifying that the power supply device is connected to the external power source by wire, displaying through a display panel a UI selecting whether to supply power to the display system by a wired manner or by a wireless manner.

BRIEF DESCRIPTION OF THE DRAWINGS

FIG. 1A is a diagram illustrating a state in which a power supply device supplies power to a display device in a wireless manner according to an embodiment of the disclosure;

FIG. 6 is a diagram illustrating a state in which a display system displays various UIs on a display panel according to another embodiment of the disclosure;

FIG. 7 is a diagram illustrating a state in which a display system displays various UIs on a display panel according to another embodiment of the disclosure;

DETAILED DESCRIPTION OF EXAMPLE EMBODIMENTS

Figure 1B:
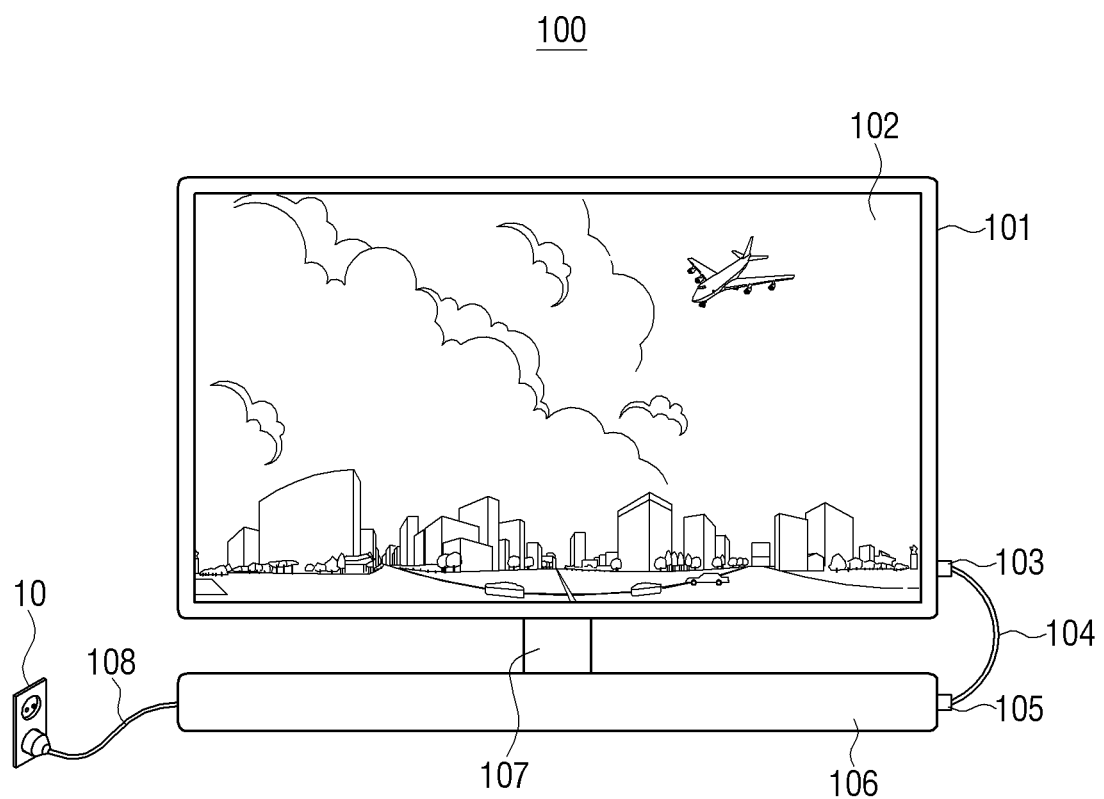
FIG. 1B is a diagram illustrating a state in which a power supply device supplies power to a display device in a wired manner according to an embodiment of the disclosure.

Hereinafter, various embodiments of this specification will be described in more detail with reference to accompanying drawings. Meanwhile, it should be noted that the various embodiments are not for limiting the technology described in this specification to a specific embodiment, but they should be interpreted to include various modifications, equivalents and/or alternatives of the technology described in this specification. Also, with respect to the detailed description of the drawings, identical or similar components may be designated by identical or similar reference numerals.

In addition, the expressions such as "first" and "second" described in this specification may be used to describe various elements, but the expressions are not intended to limit the elements.

The expressions such as "first" and "second" are used only to distinguish one element from another element. For example, a first element may be called a second element, and a second element may be called a first element in a similar manner, without departing from the scope of protection of the disclosure.

Also, the terms used in the embodiments of the disclosure may be interpreted as meanings generally known to those of ordinary skill in the art described in the disclosure, unless defined differently in the disclosure.

FIG. 1A is a diagram illustrating a state in which a power supply device supplies power to a display device in a wireless manner according to an embodiment of the disclosure.

According to FIG. 1A, a display system 100 includes a display device 101 and a power supply device 106.

For the convenience of explanation, the display system 100 is suggested as a wall hanging type TV in this embodiment. However, the display system 100 is not limited thereto, and it may be a stand type TV or a rotating wall hanging type TV. Also, the display system 100 may be a digital signage, a video wall, a large-size display panel, a kiosk, or a computer monitor, other than a TV. Illustration and explanation of embodiments wherein such various products are applied will be omitted.

On one surface of the display device 101, a display panel 102 is mounted. The display panel 102 may output various contents transmitted from a contents source, and it may also output a user interface (UI). An embodiment wherein the display panel 102 outputs a UI will be described in detail in the following descriptions.

FIG. 1A illustrates that the power supply device 106 is disposed in the lower part of the display device 101. However, a location wherein the power supply device 106 is disposed is not limited thereto, and the power supply device 106 may be disposed in the left part, the right part, or the upper part of the display device 101.

The power supply device 106 is connected to an external power source by means of a power cable 108. In general, an external power source consists of a consent 10 supplying power to the indoors. The power supply device 106 supplies power to the display device 101 by wire or wirelessly.

The power supply device 106 and the display device 101 are electronically connected by a connection cable 104. The connection cable 104 may be implemented as a cable having 4 pins, 5 pins, 6 pins, 8 pins, or 24 pins, or a cable having a plurality of terminals that are capable of supplying power. Also, the connection cable 104 may be constructed such that it can transmit an image signal together with power. In this case, the connection cable 104 may include functions of D-SUB, DVI, and HDMI cables. In addition, the connection cable 104 may include functions of USB and LAN cables.

The power supply device 106 and the display device 101 include a first connector and a second connector 105, 103, respectively, and both ends of the connection cable 104 connect to the first connector and the second connector 105, 103, respectively. On one side of the power supply device 106, the first connector 105 is formed, and on one side of the display device 101, the second connector 103 is formed. FIG. 1A illustrates that the first connector and the second connector 105, 103 are formed on the right side surfaces of the power supply device 106 and the display device 101, respectively. However, locations wherein the first connector and the second connector 105, 103 are formed are not limited thereto, and each of them may be formed in various locations such as the left side surfaces, the back side surfaces, and the top surfaces of the power supply device 106 and the display device 101.

Also, for minimizing the length of the connection cable 104, each of the first connector and the second connector 105, 103 may be formed on the same surfaces of the power supply device 106 and the display device 101. However, the first connector and the second connector 105, 103 do not necessarily have to be formed on the same side surfaces. Rather, the first connector 105 may be formed on the left side surface of the power supply device 106, and the second connector 103 may be formed on the back surface of the display device 101. As described above, each of the first connector and the second connector 105, 103 may be formed on different side surfaces of the power supply device 106 and the display device 101.

FIG. 1B is a diagram illustrating a state in which a power supply device supplies power to a display device in a wired manner according to an embodiment of the disclosure.

According to FIG. 1B, the display device 101 may be connected to the power supply device 106 by the connection cable 104. The connection cable 104 may be connected to the first and second connectors 105, 103 and transmit power and/or an image signal from the power supply device 106 to the display device 101.

When the connection cable 104 is connected to the first and second connectors 105, 103, the power supply device 106 according to an embodiment of the disclosure stops supplying power to the display device 101 in a wireless manner, and supplies power to the display device 101 in a wired manner through the connection cable 104. In contrast, if the connection cable 104 is separated from one of the first and second connectors 103, 105, the power supply device 106 stops supplying power to the display device 101 in a wired manner, and supplies power to the display device 101 in a wireless manner. As described above, the display system 100 according to an embodiment of the disclosure may simply convert the power supply method from a wireless manner to a wired manner or from a wired manner to a wireless manner by connecting the power supply device 106 and the display device 101 through the connection cable 104, or separating the connection cable 104 from one of them.

In addition, the display system 100 may further include a support 107. One end and the other end of the support 107 are separately connected to the display device 101 and the power supply device 106, respectively. In case the support 107 is connected to the display device 101 and the power supply device 106, the power supply device 106 may support the display device 101 by using the support 107. FIG. 1B illustrates that the support 107 is connected to the lower side of the display device 101 and the upper side of the power supply device 106. However, locations wherein the support 107 is connected are not limited thereto. If the state of the display device 101 illustrated in FIG. 1B is referred to as an initial state of disposition, the support 107 may support a state wherein the display device 101 rotated by ±90°, respectively, from the initial state of disposition. In this case, the support 107 may be connected to the left side or the right side of the display device 101. Also, the support 107 may be connected to the left side surface or the right side surface of the power supply device 106, other than the center portion of the back surface. As described above, the support 107 may be connected to various portions of the power supply device 106 and the display device 101.

Also, there may be a plurality of supports 107. Although FIG. 1B illustrates only an example wherein one support 107 is connected to the center portion of the back surface of the display device 101, in case there are a plurality of supports 107, one support may be connected to the left side surfaces of the display device 101 and the power supply device 106, and the other support may be connected to the right side surfaces of the display device 101 and the power supply device 106. As described above, the power supply device 106 and the display device 101 may have various relations of disposition with each other.

A configuration wherein the support 107 is connected to the display device 101 and the power supply device 106 will be described in detail with reference to FIGS. 5A and 5B in the following descriptions.

In a display system 100 according to another embodiment of the disclosure, the connection cable 104 may be formed inside the support 107. Accordingly, if the support 107 is connected to both of the display device 101 and the power supply device 106, the power supply device 106 may supply power to the display device 101 in a wired manner, and if the support 107 is separated from one of the display device 101 and the power supply device 106, the power supply device 106 may supply power to the display device 101 in a wireless manner.

As described above, the display system 100 according to an embodiment of the disclosure may attach the support 107 to the display device 101 and the power supply device 106 according to a user's preference, and thereby utilize the power supply device 106 as a stand for the display device 101. Also, in case the support 107 is separated from the display device 101 and the power supply device 106, the display device 101 may be disposed in various places. In addition, as there is no separate stand between the display device 101 and the power supply device 106 other than the support 107, wireless power transmission efficiency is high in a state in which the display device 101 is connected to the power supply device 106 through the support 107.

Figure 2A:
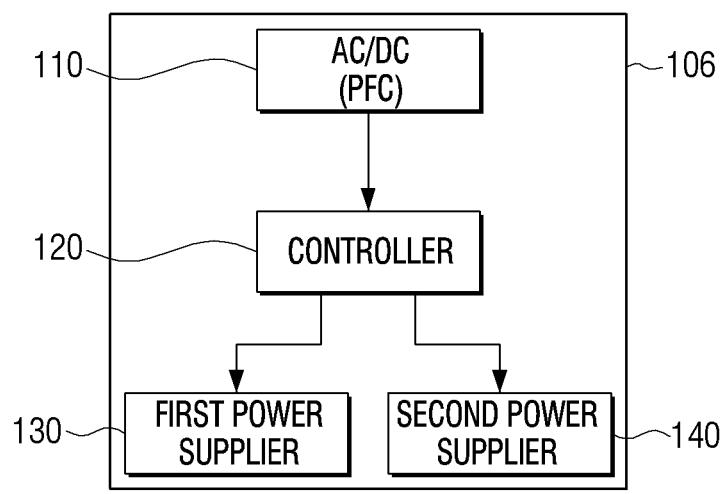
FIG. 2A is a block diagram illustrating a power supply device according to an embodiment of the disclosure.

FIG. 2A is a block diagram illustrating a power supply device according to an embodiment of the disclosure.

According to FIG. 2A, the power supply device 106 includes an alternate current/direct current port flow control (AC/DC PFC) 110, a controller 120, a first power supplier 130, and a second power supplier 140.

The AC/DC PFC 110 performs the role of converting an alternate current introduced from the consent 10 to the power supply device 106 into a direct current, and reducing power loss that may be generated at the time of conversion.

The controller 120 transmits a signal by using the connection cable 104, and when the transmitted signal is received at the controller 120 again, the controller 120 stops the operation of the first power supplier 130, and controls such that the second power supplier 140 operates. Also, the controller 120 may control the power supply device 106 such that an image signal is transmitted to the display device 101 in a wired or wireless manner.

The power supply device 106 includes a first power supplier 130 supplying power to the display device 101 in a wired manner through the connection cable 104, and a second power supplier 140 supplying power to the display device 101 in a wireless manner.

In case the power supply device 106 supplies power to the display device 101 in a wired manner, power introduced from the consent 10 to the power supply device 106 is supplied to the display device 101 via the connection cable 104 through the first power supplier 130. Meanwhile, in case the power supply device 106 supplies power to the display device 101 in a wireless manner, power introduced from the consent 10 to the power supply device 106 is converted into a magnetic field through the second power supplier 140. This magnetic field generates an induced current at the display device 101, and makes power supplied to the display device 101 wirelessly. The first power supplier 130 may also be referred to as a wired power supply module, and the second power supplier 140 may also be referred to as a wireless power supply module.

Figure 2B:
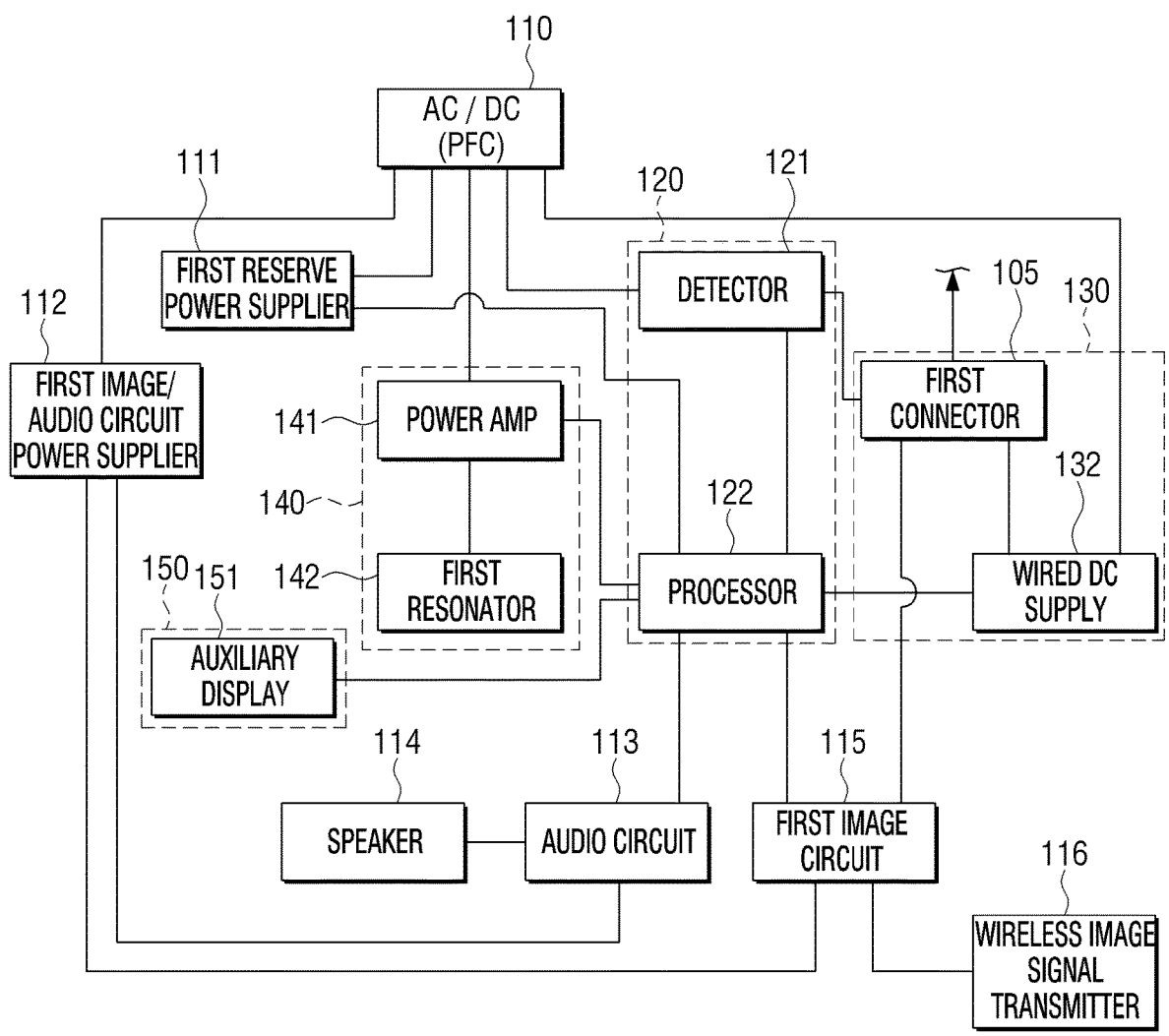
FIG. 2B is a diagram illustrating an example of an internal configuration of a power supply device.

FIG. 2B is a diagram illustrating an example of an internal configuration of a power supply device.

According to FIG. 2B, the controller 120 includes a detector 121 and a processor 122. Also, the first power supplier 130 includes a wired DC supply 132 and a first connector 105. In addition, the second power supplier 140 includes a power amp 141 and a first resonator 142. Other than the above, the power supply device 106 includes a first image/audio circuit power supplier 112, a first image circuit 115, an audio circuit 113, a speaker 114, and a warning device 150, and it may further include a first reserve power supplier 111. Also, although not illustrated in FIG. 2B, the power supply device 106 may also include a remote controller signal receiver.

When the detector 121 identifies connection information of the display device 101 and the power supply device 106, and transmits the connection information to the processor 122, the processor 122 may control the operations of the first power supplier, the second power supplier, and the warning device 130, 140, 150 based on the connection information. Such connection information may consist of signals, and may include various signals. Specifically, the processor 122 may control the detector 121 to transmit and receive signals, and according to whether the detector 121 transmits and receives signals, connection information of the display device 101 and the power supply device 106 may be generated differently, and the information may be transmitted to the processor 122.

The detector 121 is electronically connected to the first connector 105, and transmits a signal to one line among a plurality of lines included in the connection cable 104 according to control of the processor 122. If the display device 101 and the power supply device 106 are connected with each other through the connection cable 104, the signal transmitted by the detector 121 returns to another line included in the connection cable 104, and the detector 121 may receive the signal. Then, the detector 121 transmits to the processor 122 the information that the display device 101 and the power supply device 106 are connected in a wired manner.

Also, the detector 121 is electronically connected to the AC/DC PFC 110, and may detect whether the consent 10 and the AC/DC PFC 110 are connected. The detector 121 transmits connection information of the consent 10 and the AC/DC PFC 110 to the processor 122, and makes the processor 122 determine whether the power supply device 106 is connected to an external power source.

If the processor 122 determines that the display device 101 and the power supply device 106 are disconnected based on the connection information received from the detector 121, the processor 122 controls the second power supplier 140 such that the power supply device 106 supplies power to the display device 101 in a wireless manner. Meanwhile, if the processor 122 determines that the display device 101 and the power supply device 106 are connected in a wired manner, the processor 122 controls the first power supplier 130 of the power supply device 106 such that power is supplied to the display device 101 in a wired manner.

The first power supplier 130 includes a wired DC supply 132 and a first connector 105 to which the connection cable 104 can connect, for supplying power having a constant voltage to the display device 101.

The wired DC supply 132 makes a current converted into a direct current at the AC/DC PFC 110 pass through a low band pass filter, and thereby removes the noise of the direct current, and supplies direct current power having a constant voltage to the display device 101.

The first connector 105 is constituted such that pins mounted on one end between both ends of the connection cable 104 can connect to it. A specific embodiment of the first connector 105 will be described in detail with reference to FIG. 4 in the following descriptions.

The second power supplier 140 includes a power amp 141 for amplifying frequencies of currents and a first resonator 142 forming a magnetic field with currents transmitted from the power amp 141. The power amp 141 converts the frequency of a current converted into a direct current at the AC/DC PFC 110 into a frequency capable of wireless power transmission, and transmits the current to the first resonator 142.

The first resonator 142 is implemented as a form wherein a power transmission coil is mounted in its inside, and flows the current transmitted from the power amp 141 to the power transmission coil. Here, in the power transmission coil, an electromagnetic field having specific directivity is formed. Such an electromagnetic field makes an induced current generated at a wireless power receiver mounted on the display device 101.

The first image/audio circuit power supplier 112 supplies power to the first image circuit 115, the audio circuit 113, and the speaker 114.

Figure 3:
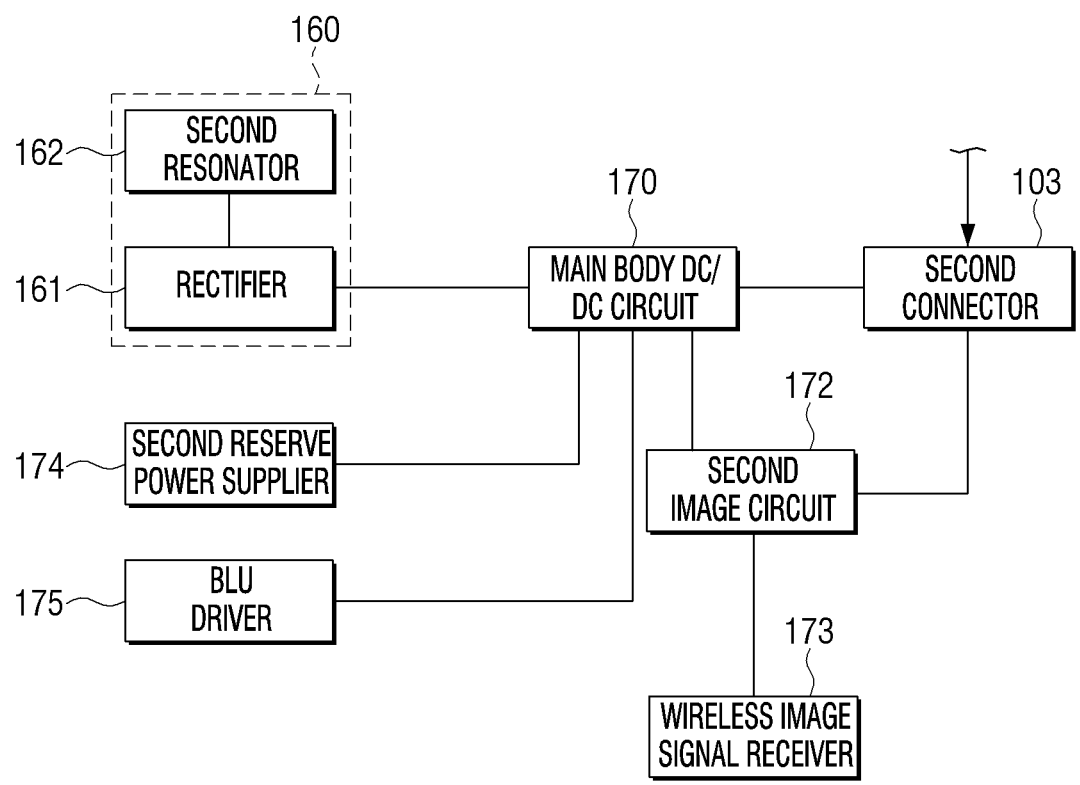
FIG. 3 is a diagram illustrating an example of an internal configuration of a display device according to an embodiment of the disclosure.

The first image circuit 115 converts image signals of various contents transmitted from a contents source into formats that can be output, and transmits the signals to a second image circuit 172 mounted on the display device 101 (refer to FIG. 3). The first image circuit 115 is electronically connected to the processor 122, and in case the connection cable 104 is not connected to the display device 101 or the power supply device 106, the first image circuit 115 operates a wireless image signal transmitter 116 according to control of the processor 122, and transmits image signals to the display device 101 in a wireless manner.

The wireless image signal transmitter 116 may transmit information data such as image data and audio data to the display device 101. For wireless transmission of such information data, the wireless image signal transmitter 116 supports various wireless communication methods such as Bluetooth or WiFi, Zigbee, etc.

The audio circuit 113 converts audio signals of various contents transmitted from a contents source into formats that can be output at the speaker 114 and transmit them to the speaker 114. The speaker 114 outputs the audio signals transmitted from the audio circuit 113 as voice sounds or audio sounds. In FIG. 2B, it is illustrated that the speaker 114 is installed inside the power supply device 106. However, disposition of the speaker 114 is not limited thereto, and a separate speaker 114 may be disposed while being separated from the power supply device 106. Also, the speaker 114 may be mounted on the display device 101, and an embodiment wherein various speakers that are being sold in the market are connected to the power supply device 106 or the display device 101 may also be implemented.

Also, the audio circuit 113 is electronically connected to the processor 122, and in case the AC/DC PFC 110 is not connected to the consent 10, the audio circuit 113 may broadcast a voice sound requesting a warning sound or connection to a power source through the speaker 114, according to control of the processor 122.

The warning device 150 according to an embodiment of the disclosure includes an auxiliary display 151, and may include devices that can visually display notification such as an LED, a light-emitting lamp, a laser signal, an infrared signal display device, etc. other than the auxiliary display. In case the warning device 150 is implemented as an LED, and the power supply device 106 is connected to an external power source, the auxiliary display 151 is implemented such that it can display an icon or a user interface (UI) according to control of the processor 122.

The first reserve power supplier 111 means a power source provided separately from the first and second power suppliers 130, 140, and may be implemented as a form including a main battery and an auxiliary battery. The first reserve power supplier 111 may be electronically connected to the AC/DC PFC 110, and may be charged by power supplied from the AC/DC PFC 110. However, the disclosure is not limited thereto, and the first reserve power supplier 111 may be implemented in the form of a primary battery. Hereinafter, for the convenience of explanation, the first reserve power supplier 111 will be explained as a reserve power supplier that is supplied with power from the AC/DC PFC 110, and stores reserve power.

In case the power supply device 106 is not connected to an external power source, or the display system 100 is in a stand-by state, the first reserve power supplier 111 may supply power to only some components such as the detector 121, the processor 122, the first image circuit 115, the remote controller signal receiver (not shown), the display panel 102, the BLU driver 175 (refer to FIG. 3), etc. Also, in case operations of the first and second power suppliers 130, 140 are stopped, the first reserve power supplier 111 may perform a role of supplying auxiliary power to the display system 100. In this case, the first reserve power supplier 111 may directly supply power to the display device 101 through the power amp 141 or the wired DC supply 132, but not through the AC/DC PFC 110.

Also, in case the power supply device 106 is not connected to an external power source, or the display device 101 is not supplied with power from the power supply device 106 in a wired or wireless manner, the processor 122 may control the display device 101 in a wireless manner such that the display panel 102 displays a UI informing that a power source is not connected or a UI requesting to connect to an available power source.

FIG. 3 is a diagram illustrating an example of an internal configuration of a display device according to an embodiment of the disclosure. According to FIG. 3, the display device 101 includes a wireless power receiver 160, a second connector 103, a main body DC/DC circuit 170, a second image circuit 172, and a back light unit (BLU) driver 175. Meanwhile, the wireless power receiver 160 includes a second resonator 162 and a rectifier 161, and the second image circuit 172 includes a wireless image signal receiver 173.

Other than the above, the display device 101 may further include a second reserve power supplier 174, and although not illustrated in FIG. 3, the display device 101 may also include an antenna signal receiver module for receiving public broadcasting, an interface for receiving cable broadcasting, an HDMI for receiving signals from various external devices, etc. Meanwhile, the second image circuit 172 may process various contents received through such interfaces. Also, a remote controller signal receiver (not shown) for receiving a turn-on or standby instruction of a user may be mounted.

The wireless power receiver 160 consists of a second resonator 162 wherein an induction current is formed by a magnetic field generated from the first resonator 142 and a rectifier 161 that converts an alternate current generated at the second resonator 162 into a direct current.

The second resonator 162 is implemented as a form wherein a power receiving coil is installed in its inside, and currents are induced at the power receiving coil by an electromagnetic field generated at the first resonator 142. Accordingly, the first resonator and the second resonator 162 should be disposed within a range of effective distance wherein an electromagnetic field generated at the first resonator 142 can induce currents at the power receiving coil inside the second resonator 162.

As the induced current formed at the second resonator 162 is an alternate current, the rectifier 161 converts the current into a direct current, and transmits it to the main body DC/DC circuit 170.

Meanwhile, the connection cable 104 may be connected to the second connector 103. A detailed embodiment of the second connector 103 will be described later with reference to FIG. 4. If one end between both ends of the connection cable 104 is connected to the first connector 105, and the other end is connected to the second connector 103, the wired DC supply 132 supplies power to the main body DC/DC circuit 170 in a wired manner through the connection cable 104.

The main body DC/DC circuit 170 is supplied with power from the second connector 103 or the rectifier 161, and supplies power having a constant voltage to various components inside the display device 101. As illustrated in FIG. 3, the main body DC/DC circuit 170 supplies power having a constant voltage to the second image circuit 172 and the BLU driver 175.

The second image circuit 172 receives an image signal in a wired manner through the second connector 103, or receives an image signal in a wireless manner through the wireless image signal receiver 173. In the case of receiving an image signal in a wired manner, an image signal input to the first image circuit 115 is transmitted to the second image circuit 172 through the first connector 105, the connection cable 104, and the second connector 103. Meanwhile, in the case of receiving an image signal in a wireless manner, the wireless image signal receiver 173 included in the second image circuit 172 receives a wireless image signal from the wireless image signal transmitter 116 mounted on the power supply device 106, and transmits the signal to the second image circuit 172. When an image signal is transmitted in a wired or wireless manner, the second image circuit 172 adjusts the amount of light that each part of the display panel 102 transmits based on the transmitted image signal.

The BLU driver 175 is supplied with power from the main body DC/DC circuit 170 and transmits light evenly to the entire display panel 102.

The second reserve power supplier 174 means a power source that is provided separately from the main DC/DC circuit 170, and it may be implemented as a form including a main battery and an auxiliary battery. The second reserve power supplier 174 may be electronically connected to the display device DC/DC circuit 170, and may be charged by the power provided from the main body DC/DC circuit 170. However, the disclosure is not limited thereto, and the second reserve power supplier 174 may be implemented in the form of a primary battery. Hereinafter, for the convenience of explanation, the second reserve power supplier 174 will be explained as a reserve power supplier that is supplied with power from the main body DC/DC circuit 170 and stores reserve power.

When power is supplied to the display device 101 in a wired or wireless manner, power suppled from the second connector 103 or the rectifier 161 is stored in the reserve power supplier 174 via the main DC/DC circuit 170. Also, in case the display system 100 is in a standby state or power is not supplied to the main DC/DC circuit 170 through the second connector 103 or the rectifier 161, the second reserve power supplier 174 may supply power to only some components such as the display panel 102, the BLU driver 175, the second image circuit 172, the remote controller signal receiver (not shown), etc. Alternatively, in case the operation of the main DC/DC circuit 170 is stopped, the second reserve power supplier 174 may supply auxiliary power to the display panel, the BLU driver 175, and the second image circuit 172.

In addition, in case the power supply device 106 is not connected to an external power source or the display device 101 cannot be supplied with power from the power supply device 106 in a wired or wireless manner, the second image circuit 172 may operate the display panel 102 such that the display panel 102 displays a UI informing that a power source is not connected or a UI requesting to connect to an available power source.

Hereinafter, configurations of the first and second connectors 105, 103 according to an embodiment of the disclosure will be described with reference to FIG. 4. Also, the display device 101 constituting the display system 100 may be referred to as the main body, and hereinafter, the display system 100 will be referred to as the main body for the convenience of explanation.

Figure 4:
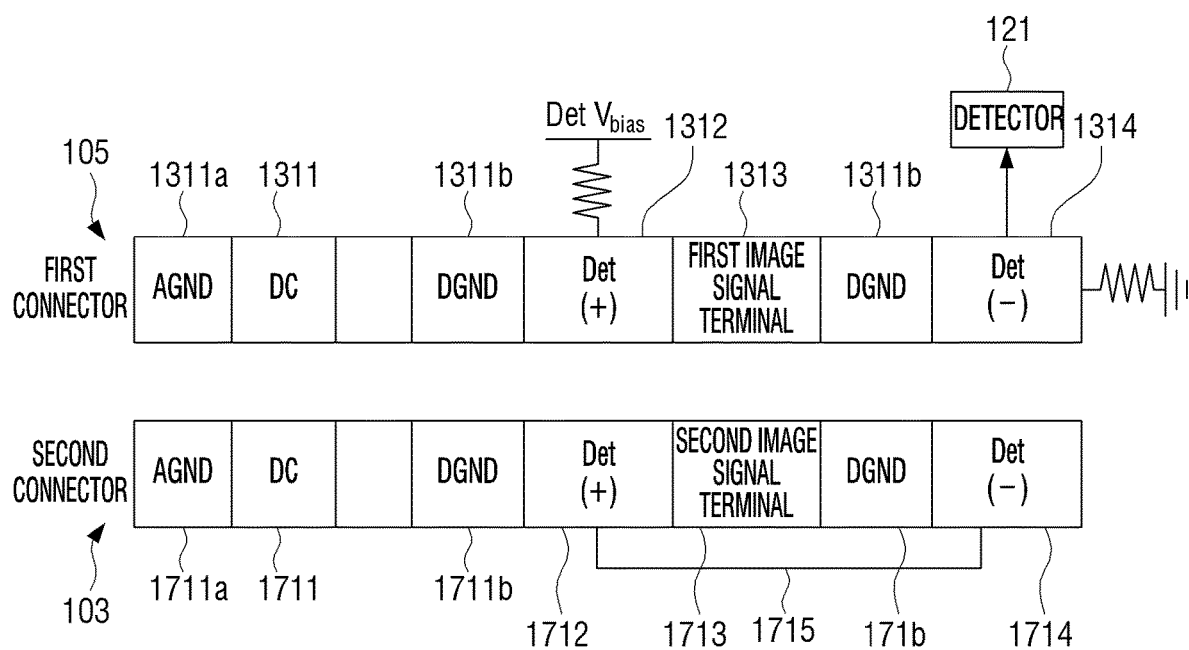
FIG. 4 is a diagram illustrating an example of disposition of pins of first and second connectors according to an embodiment of the disclosure.

FIG. 4 is a diagram illustrating an example of disposition of pins of the first and second connectors 105, 103 according to an embodiment of the disclosure.

Referring to FIG. 4, the first connector 105 formed on the side of the power supply device 106 includes a plurality of power terminals DC, AGND, DGND 1311, 1311a, 1311b on the side of the first connector for supplying DC power, a first image signal terminal 1313 for transmitting an image signal, a first detection terminal Det(+) 1312 on the side of the first connector, and a second detection terminal Det(−) 1314 on the side of the first connector. Meanwhile, the second connector 103 formed on the display device 101 includes a plurality of power terminals DC, AGND, DGND 1711, 1711a, 1711b for being supplied DC power, a second image signal terminal 1713 for receiving an image signal, a first detection terminal Det(+) 1712 on the side of the second connector, and a second detection terminal Det(−) 1714 on the side of the second connector.

The plurality of power terminals DC, AGND, DGND 1311, 1311a, 1311b on the side of the first connector are terminals supplying DC power transmitted from the wired DC supply 132 to the main body 101. These power terminals may be connected to the plurality of power terminals DC, AGND, DGND 1711, 1711a, 1711b on the side of the second connector through the connection cable 104.

The first image signal terminal 1313 is a terminal transmitting an image signal transmitted from the first image circuit 115 to the second image circuit 172, and may be connected to the second image signal terminal 1713 through the connection cable 104.

The first detection terminal Det(+) 1312 on the side of the first connector and the second detection terminal Det(−) 1314 on the side of the first connector are terminals used for detecting whether the power supply device 106 and the main body 101 are connected. The detector 121 transmits a signal to the first detection terminal Det(+) 1312 on the side of the first connector according to control of the processor 122, and detects the signal received at the second detection terminal Det(−) 1314 on the side of the first connector. A voltage signal may be used as a signal. However, various signals that can detect whether the power supply device 106 and the main body 101 are connected may be used, other than a voltage signal. Hereinafter, for the convenience of explanation, an example wherein a voltage signal is used will be described.

The first detection terminal Det(+) 1312 on the side of the first connector is connected to a detected voltage supply source Det VBias for transmitting a voltage signal. Also, the first detection terminal Det(+) 1312 on the side of the first connector is connected to the first detection terminal Det(+) 1712 on the side of the second connector, in a state in which the power supply device 106 and the main body 101 are connected through the connection cable 104.

The first detection terminal Det(+) 1712 on the side of the second connector is electronically connected to the second detection terminal Det(−) 1714 on the side of the second connector by a circuit pattern of a circuit substrate disposed inside the main body 101 or a closed loop line 1715. Also, the second detection terminal Det(−) 1714 on the side of the second connector is connected to the second detection terminal Det(−) 1314 on the side of the first connector in a state in which the power supply device 106 and the main body 101 are connected through the connection cable 104.

Accordingly, the connection cable 104 includes at least two lines connected to the first detection terminal Det(+) 1712 on the side of the second connector and the second detection terminal Det(−) 1714 on the side of the second connector formed on both ends of the closed loop line 1715.

Also, the second detection terminal Det(−) 1314 on the side of the first connector is electronically connected to a resistance and the detector 121.

Referring to FIGS. 2B to 4, a process wherein the power supply device 106 detects connection to the main body 101 and selectively controls power supply of the power supply device 106 in a wired or wireless manner is as follows.

The processor 122 controls the detector 121 such that the detector 121 transmits a voltage signal to the first detection terminal Det(+) 1312 on the side of the first connector through the detected voltage supply source Det VBias. If the connection cable 104 is connected to the first and second connectors 105, 103, a closed loop circuit is generated by the closed loop line 1715. Then, the voltage is distributed according to the resistance connected to the first detection terminal Det(+) 1312 on the side of the first connector and the resistance connected to the second detection terminal Det(−) 1314 on the side of the first connector. Accordingly, the voltage value biased to the second detection terminal Det(−) 1314 on the side of the first connector is changed. Then, the detector 121 detects the changed voltage of the second detection terminal Det(−) 1314 on the side of the first connector. In case the changed voltage value of the second detection terminal Det(−) 1314 on the side of the first connector is equal to or greater than a predetermined value, the detector 121 transmits connection information that the power supply device 106 is connected to the main body 101 to the processor 122. Based on the connection information, the processor 122 controls the first power supplier 130 such that the power supply device 106 supplies power to the main body 101 in a wired manner.

In contrast, if the connection cable 104 is disconnected from one of the first and second connectors 105, 103, a closed loop circuit is not generated, and distribution of the voltage with respect to each of the first detection terminal Det(+) 1312 on the side of the first connector and the second detection terminal Det(−) 1314 on the side of the first connector is not performed. Also, the detector 121 detects that the voltage value of the second detection terminal Det(−) 1314 on the side of the first connector is less than a predetermined value. In this case, the detector 121 transmits connection information that the power supply device 106 is not connected to the main body 101 to the processor 122. Based on the connection information, the processor 122 controls the second power supplier 140 such that the power supply device 106 supplies power to the main body 101 in a wireless manner.

Accordingly, the detector 121 compares the voltage value of the second detection terminal Det(−) 1314 on the side of the first connector with a predetermined value, and detects whether the power supply device 106 is connected to the main body 101, and transmits the connection information to the processor 122, and the processor 122 controls the operations of the first and second power suppliers 130, 140 through such connection information.

As described above, in the display system 100 according to an embodiment of the disclosure, it is detected whether the power supply device 106 is connected to the main body 101 based on the voltage value detected by the detector 121, and when the detection result is transmitted to the processor 122, the processor 122 selects a wired or wireless power supply method according to the received detection result.

A user may simply convert a method of supplying power supplied to the display system 100 by connecting the connection cable 104 to both of the main body 101 and the power supply device 106, or by separating the connection cable 104. Also, according to a user's preference, the power supply device 106 and the main body 101 of the display device may be disposed while their locations are changed variously, and then power may be supplied to the display system 100 in a wired or wireless manner.

In addition, in a display system according to another embodiment of the disclosure, the detector 121 may detect whether the consent 10 and the AC/DC PFC 110 are connected. The detector 121 may detect whether the consent 10 and the AC/DC PFC 110 are connected based on the voltage value of the AC/DC PFC 110, and transmit the connection information to the processor 122.

If the detector 121 detects a voltage less than a predetermined voltage from the AC/DC PFC 110, the detector 121 transmits connection information that the consent 10 and the AC/DC PFC 110 are not connected to the processor 122. Then, the processor 122 may control the first reserve power supplier 111 to supply reserve power to the main body 101 through the AC/DC PFC 110.

Meanwhile, in the aforementioned embodiment, it was described that the detector 121 determines whether the main body 101 and the power supply device 106 are connected based on a voltage value. However, it is also possible that the detector 121 determines whether the main body 101 and the power supply device 106 are connected based on a change of a value of a current flowing through a closed loop circuit.

Figure 5A:
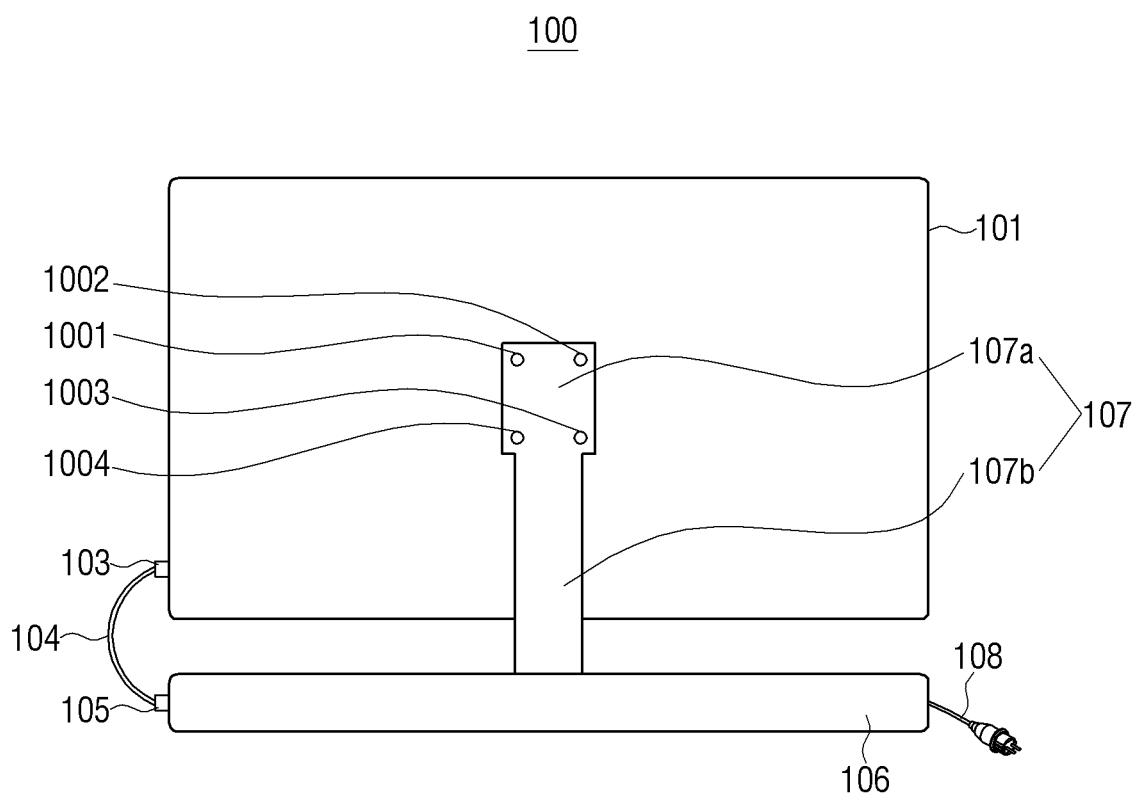
FIG. 5A is a diagram illustrating a back surface of a display system on which a support is mounted.
Figure 5B:
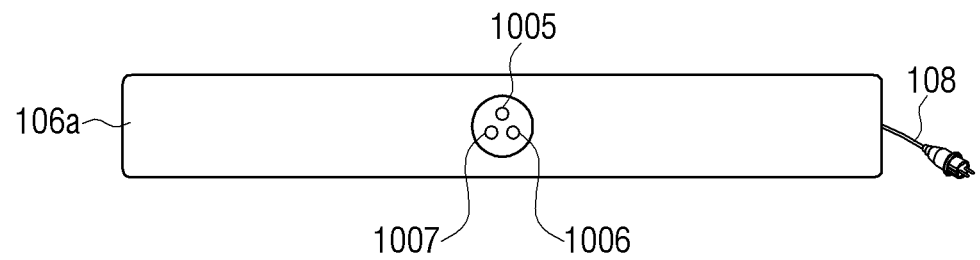
FIG. 5B is a diagram illustrating a bottom surface of a power supply device on which a support is mounted.

FIG. 5A is a diagram illustrating a back surface of a display system 100 on which a support 107 is mounted, and FIG. 5B is a diagram illustrating a bottom surface 106a of a power supply device on which a support 107 is mounted.

In FIGS. 5A and 5B, a state in which the support 107 is connected to the center portion of the back surface of the main body 101, and is connected to the center portion of the top surface of the power supply device 106 was illustrated. However, the location wherein the support 107 is connected to the main body 101 and the power supply device 106 is not limited thereto, and the location may be changed variously. Also, as mentioned above, there may be a plurality of supports 107.

According to FIG. 5A, the support 107 consists of a support head 107a and a support body 107b. The support head 107a is connected to the main body 101, and one end of the support body 107b is connected to the power supply device 106.

FIG. 5A illustrates a plurality of holes 1001, 1002, 1003, 1004 formed on the support head 107a. Through the plurality of holes 1001, 1002, 1003, 1004, the support head 107a may be screw- or rivet-coupled with the main body 101. Also, FIG. 5B illustrates a plurality of other holes 1005, 1006, 1007 formed on the bottom surface 106a of the power supply device. Through the plurality of other holes 1005, 1006, 1007, the support body 107b may be screw- or rivet-coupled with the power supply device 106.

Meanwhile, the support 107 may be connected to the main body 101 and the power supply device 106 by various coupling methods, other than a method of screw- or rivet coupling with the main body 101 and the power supply device 106. For example, a method wherein the support head 107a is slide-coupled with a groove formed on the display device 101 and the support body 107b is snap-coupled with a specific portion of the power supply device 106, or a method wherein the support head 107a is snap-coupled with the display device 101 and the support body 107b is slide-coupled with the power supply device 106 is also possible.

If a user connects the main body 101 and the power supply device 106 by using the support 107, the power supply device 106 may be utilized as a stand supporting the main body 101. Accordingly, the display system 100 may be disposed in various places such as on top of a shelf and on top of a table according to a user's preference, other than just being hung on a wall. Also, as there is no component shielding wireless power transmission from the power supply device 106 between the power supply device 106 and the main body 101, effective wireless power supply is possible, even if the connection cable 104 is not connected to the power supply device 106 or the main body 101 in a state in which the power supply device 106 and the main body 101 are connected by the support 107.

As described above, the display system 100 according to an embodiment of the disclosure enables selection of power supply methods that suit the TV usage environments of individual users, and thus the display system 100 provides convenience to users of the display system 100.

Hereinafter, the function of a display system according to another embodiment of the disclosure of displaying a UI with respect to power connection information on a display panel will be described with reference to FIGS. 6 and 7.

FIGS. 6 and 7 are diagrams illustrating a state in which a display system 200 according to another embodiment of the disclosure displays various UIs 1021, 1022 on a display panel 102.

In the display system 200 according to another embodiment of the disclosure, the processor 122 may determine whether the power supply device 106 is connected to an external power source by using the detector 121.

If the detector 121 detects a voltage less than a predetermined voltage from the AC/DC PFC 110, the detector 121 transmits connection information that the consent 10 and the AC/DC PFC 110 are not connected to the processor 122. Based on the connection information, the processor 122 first controls the first reserve power supplier 111 to supply power to the power supply device 106 and some components of the main body 101. Also, as illustrated in FIG. 6, the processor 122 controls the auxiliary display 151 to output an icon indicating that a power source is not connected. The shape of the icon is not limited to what is illustrated in FIG. 6, and icons in various shapes may be used. Also, the processor 122 may control the first and second image circuits 115, 172 such that the display panel 102 displays a UI 1021 informing that a power source is not connected.

As described above, in the display system 200 according to another embodiment of the disclosure, in case there is no power supplied to the display system 200, a UI 1021 informing this is displayed on the display panel 102. Also, through the UI 1021, a user may clearly recognize the state of the display system 200. In addition, if a user does not want the UI 1021 to be displayed, the user may make the UI 1021 not displayed on the display panel 102 by pushing a notification cancellation button (not shown) disposed on the power supply device 106.

Also, in the display system 200 according to another embodiment of the disclosure, a UI 1022 guiding connection to a power source to a user may be displayed on the display panel 102, as illustrated in FIG. 7.

If the detector 121 detects that an external source and the power supply device 106 are not connected and transmits the connection information to the processor 122, the processor 122 may control the first reserve power supplier 111, and the first and second image circuits 115, 172 and display a UI 1022 guiding connection to a power source on the display panel 102.

Figure 8:
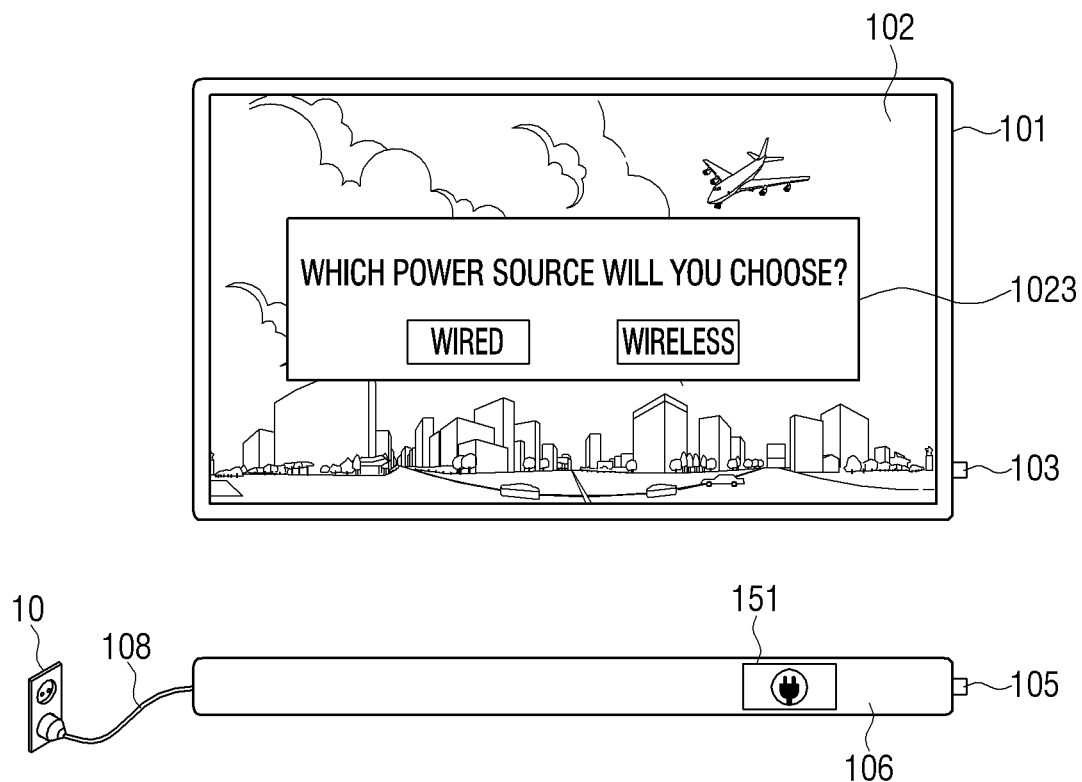
FIG. 8 is a diagram illustrating a state in which a display system displays a UI on a display panel according to still another embodiment of the disclosure.

FIG. 8 is a diagram illustrating a state in which a display system 300 according to still another embodiment of the disclosure displays a UI 1023 on the display panel 102. In the display system 300 according to still another embodiment of the disclosure, when a user turns on the display system 300, a UI 1023 selecting a power supply method for the display system 300 as a wired or wireless manner may be displayed on the display panel 102.

In case the AC/DC PFC 110 is connected to the consent 10 by the power cable 108, the detector 121 detects a voltage equal to or greater than a predetermined voltage from the AC/DC PFC 110. Then, the detector 121 transmits connection information that the consent 10 and the AC/DC PFC 110 are connected to the processor 122. Based on the connection information, the processor 122 controls the first and second image circuits 115, 172 and displays a UI 1023 selecting a power supply method as a wired or wireless manner on the display panel 102.

A user may select a power supply method in a wired or wireless manner by pushing a selection button (not shown) disposed on the power supply device 106 or the main body 101. In case the user selects a power supply method in a wired manner, the display system 300 according to this embodiment of the disclosure may additionally display a UI requesting to connect the connection cable 104 to the first and second connectors 105, 103.

As described above, the display system 300 according to still another embodiment of the disclosure makes a user select a supply method of power supplied to the main body 101 through a UI.

Hereinafter, a method for supplying power to the display system according to the disclosure will be described. If the power supply device 106 is turned on in a state in which the power supply device 106 and the main body 101 are not connected in a wired manner by the connection cable 104, the power supply device 106 supplies power to the display system 100 in a wireless manner. Also, the processor 122 controls the detector 121 and identifies whether the power supply device 106 and the main body 101 are connected. If the processor 122 determines that the power supply device 106 and the main body 101 are connected in a wired manner by the connection cable 104, the power supply device 106 supplies power to the display system 100 in a wired manner.

Figure 9:
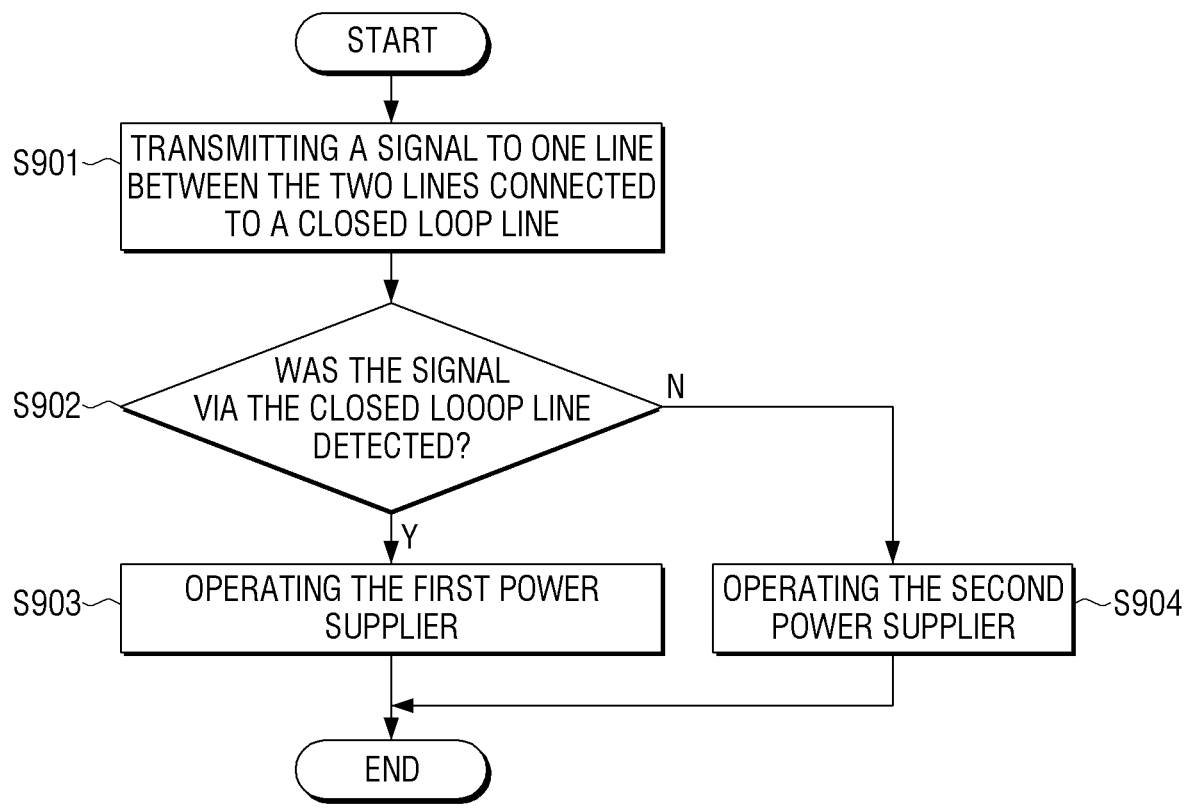
FIG. 9 is a flow chart illustrating a method for supplying power to a display system according to an embodiment of the disclosure.

FIG. 9 is a flow chart illustrating a method for supplying power to a display system according to an embodiment of the disclosure. The power supply method in a wired or wireless manner described in FIG. 9 may be executed in display systems according to the aforementioned various embodiments, but is not necessarily limited thereto, and it may be executed in display systems according to modified embodiments.

According to FIG. 9, when the power supply device 106 is turned on in the display system 100, the processor 122 controls the detector 121 to transmit a signal. According to control of the processor 122, the detector 121 transmits a signal to one line between at least two lines connected to the closed loop line 1715 at operation S901. Then, the detector 121 detects whether there is a signal that comes to the other line via the closed loop line 1715 at operation S902.

If the detector 121 detects a signal that comes to the other line via the closed loop line 1715, the detector 121 transmits connection information that the power supply device 106 and the main body 101 are connected to the processor 122. Then, the processor 122 controls the first power supplier 130, and makes power supplied to the main body 101 in a wired manner at operation S903.

However, if the detector 121 does not detect a signal that comes to the other line via the closed loop line 1715, the detector 121 transmits connection information that the power supply device 106 and the main body 101 are not connected to the processor 122. Then, the processor 122 controls the second power supplier 140, and makes power supplied to the main body 101 in a wireless manner at operation S904.

Figure 10:
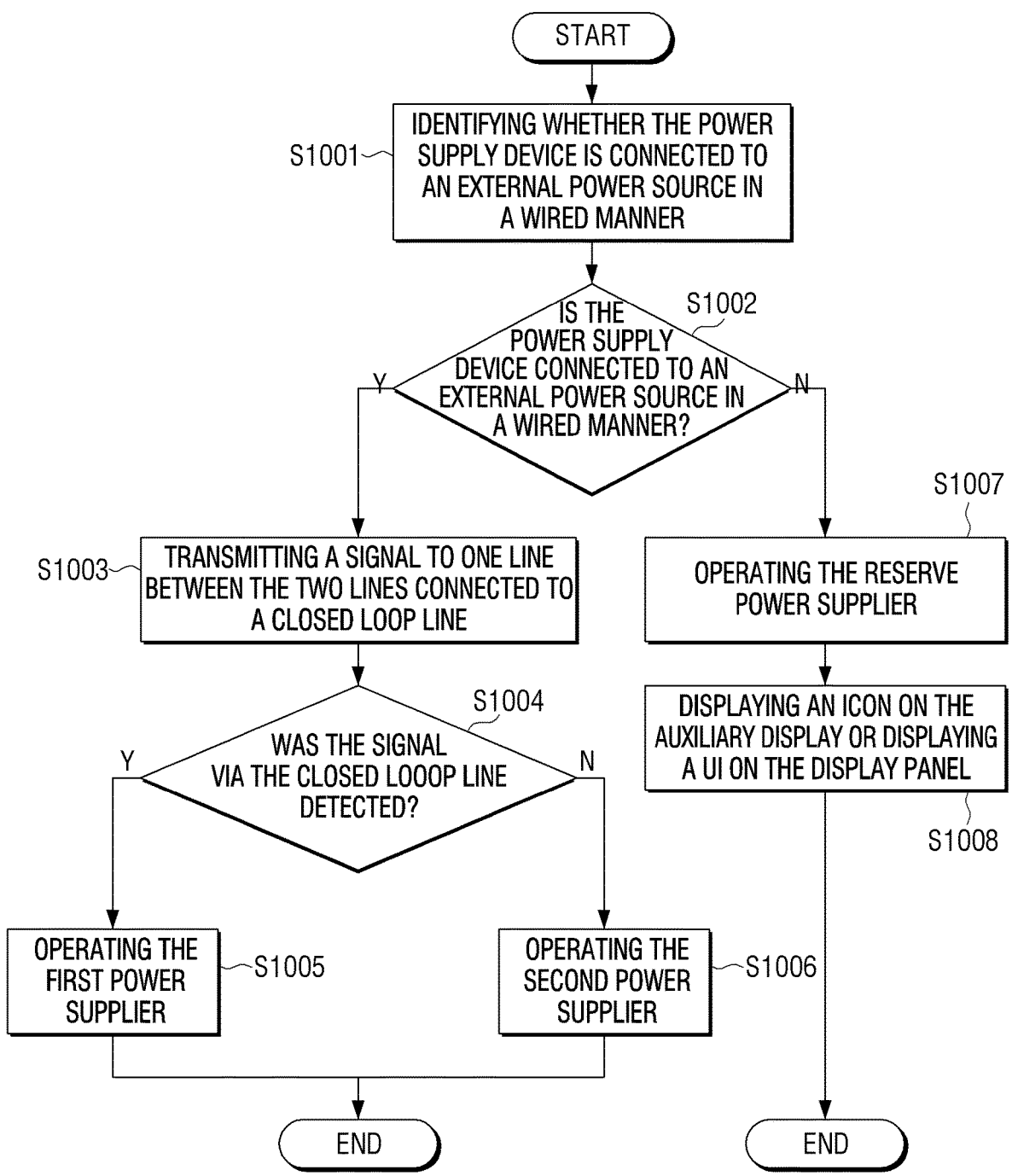
FIG. 10 is a flow chart illustrating a method for supplying power to a display system according to another embodiment of the disclosure.

FIG. 10 is a flow chart illustrating a method for supplying power to a display system according to another embodiment of the disclosure.

In a standby state, the processor 122 of the display system 200 identifies whether the power supply device 106 is connected to an external power source in a wired manner through the power cable 108 by using the detector 121 at operation S1001. The detector 121 detects the voltage of the AC/DC PFC 110, and detects whether the power supply device 106 is connected to an external power source at operation S1002.

In case the voltage measured from the AC/DC PFC 110 is equal to or greater than a predetermined voltage, the detector 121 transmits connection information that the power supply device 106 is connected to an external power source to the processor 122. Based on the connection information, the processor 122 determines that the power supply device 106 is connected to an external power source, and controls the detector 121 to transmit a signal. According to control of the processor 122, the detector 121 transmits a signal to one line between at least two lines connected to the closed loop line 1715 at operation S1003. Then, the detector 121 detects whether there is a signal that comes to the other line via the closed loop line 1715 at operation S1004.

If the detector 121 detects a signal that comes to the other line via the closed loop line 1715, the detector 121 transmits connection information that the power supply device 106 and the main body 101 are connected to the processor 122. Then, the processor 122 controls the first power supplier 130, and makes power supplied to the main body 101 in a wired manner at operation S1005.

However, if the detector 121 does not detect a signal that comes to the other line via the closed loop line 1715, the detector 121 transmits connection information that the power supply device 106 and the main body 101 are not connected to the processor 122. Then, the processor 122 controls the second power supplier 140, and makes power supplied to the main body 101 in a wireless manner at operation S1006.

Meanwhile, in case the voltage measured from the AC/DC PFC 110 is less than a predetermined voltage, the detector 121 transmits connection information that the power supply device 106 is not connected to an external power source to the processor 122. Based on the connection information, the processor 122 controls the first reserve power supplier 111 to supply power to the power supply device 106 and the main body 101 at operation S1007.

Then, the processor 122 controls the power supply device 106 and the main body 101, such that the auxiliary display 151 outputs an icon indicating that a power source is not connected, and the display panel 102 displays a UI informing that a power source is not connected at operation S1008. Also, the processor 122 may control the power supply device 106 and the main body 101, such that the display panel 102 displays a UI guiding connection to a power source instead of a UI informing that a power source is not connected.

Figure 11:
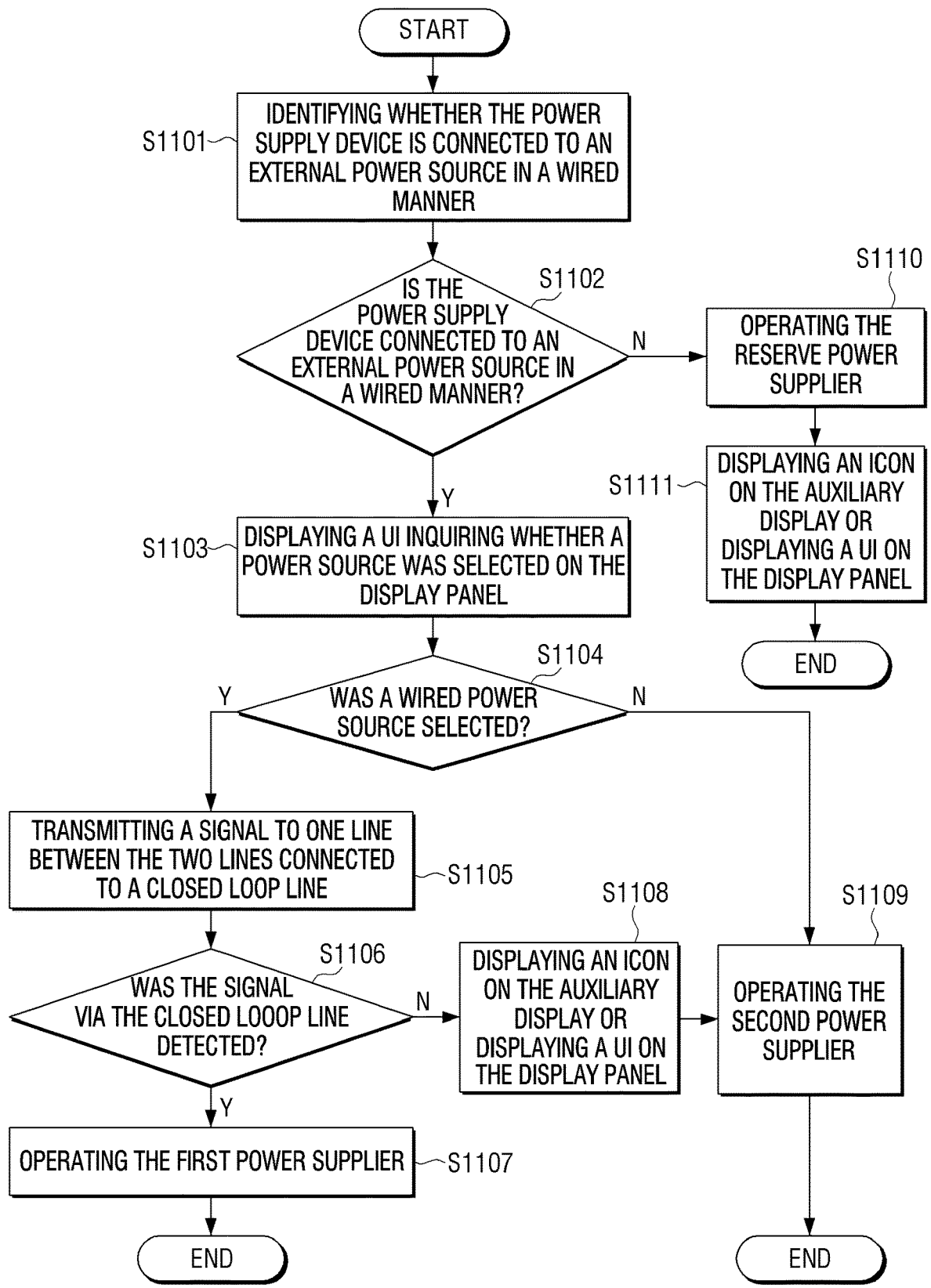
FIG. 11 is a flow chart illustrating a method for supplying power to a display system according to still another embodiment of the disclosure.

FIG. 11 is a flow chart illustrating a method for supplying power to a display system according to still another embodiment of the disclosure.

In a standby state, the processor 122 of the display system 300 identifies whether the power supply device 106 is connected to an external power source in a wired manner through the power cable 108 by using the detector 121 at operation S1101. The detector 121 detects the voltage of the AC/DC PFC 110, and detects whether the power supply device 106 is connected to an external power source at operation S1102.

In case the voltage measured from the AC/DC PFC 110 is equal to or greater than a predetermined voltage, the detector 121 transmits connection information that the power supply device 106 is connected to an external power source to the processor 122. Based on the connection information, the processor 122 determines that the power supply device 106 is connected to an external power source. Then, the processor 122 controls the power supply device 106 and the main body 101 such that a UI selecting a power supply method as a wired or wireless manner is displayed on the display panel 102 at operation S1103.

The display system 300 identifies whether an instruction to supply power in a wired manner is input at operation S1104.

If an instruction to supply power in a wired manner is not detected at the main body 101 and/or the power supply device 106, or an instruction to supply power in a wireless manner is detected, the processor 122 immediately controls the second power supplier 140, and makes power supplied to the main body 101 in a wireless manner at operation S1109.

However, if an instruction to supply power in a wired manner is detected at the main body 101 and/or the power supply device 106, the processor 122 controls the detector 121 to transmit a signal. According to control of the processor 122, the detector 121 transmits a signal to one line between at least two lines connected to the closed loop line 1715 at operation S1105. Then, the detector 121 detects whether there is a signal that comes to the other line via the closed loop line 1715 at operation S1106.

If the detector 121 detects a signal that comes to the other line via the closed loop line 1715, the detector 121 transmits connection information that the power supply device 106 and the main body 101 are connected to the processor 122. Then, the processor 122 controls the first power supplier 130, and makes power supplied to the main body 101 in a wired manner at operation S1107.

However, if the detector 121 does not detect a signal that comes to the other line via the closed loop line 1715, the detector 121 transmits connection information that the power supply device 106 and the main body 101 are not connected to the processor 122.

Then, the processor 122 controls the power supply device 106 and the main body 101 such that the display panel 102 displays a UI informing that the power supply device 106 and the main body 101 are not connected by the connection cable 104 at operation S1108. Also, as the connection cable 104 is not connected to the power supply device 106 and the main body 101, the display system 300 may additionally display a UI informing that power will be supplied in a wireless manner.

Also, the processor 122 controls the second power supplier 140, and makes power supplied to the main body 101 in a wireless manner at operation S1109.

Meanwhile, in case the voltage measured from the AC/DC PFC 110 is less than a predetermined voltage, the detector 121 transmits connection information that the power supply device 106 is not connected to an external power source to the processor 122. Based on the connection information, the processor 122 controls the first reserve power supplier 111 to supply power to the power supply device 106 and the main body 101 at operation S1110.

Then, the processor 122 controls the power supply device 106 and the main body 101, such that the auxiliary display 151 outputs an icon indicating that a power source is not connected, and the display panel 102 displays a UI informing that a power source is not connected at operation S1111. Also, the processor 122 may control the power supply device 106 and the main body 101, such that the display panel 102 displays a UI guiding connection to a power source instead of a UI informing that a power source is not connected.

As described above, the display system according to the various embodiments of the disclosure may identify whether the power supply device 106 is connected to the main body 101 in a wired manner, and convert the power supply method into a wired or wireless manner. Also, in case wired connection between the main body 101 and the power supply device 106 is suddenly disconnected, the display system may detect this immediately and supply power in a wireless manner, and at the same time, notify a user of the state of power connection through an icon or a UI. Also, in case the display system is turned on, a user is made to select a power supply method in a wired or wireless manner, and a user's convenience is thereby promoted.

So far, the disclosure has been described with reference to preferred embodiments thereof, but it should be understood that those skilled in the technical field to which the disclosure belongs would be able to combine the embodiments described, or amend and change the disclosure in various ways within the scope of the idea and the field of the disclosure described in the appended claims.

What is claimed is:

1. A power supply device which is disposed so as to be spaced apart from a display device and supplies power to the display device, the power supply device comprising:
   a first power supplier which supplies power to the display device through a cable in a wired manner;
   a second power supplier which supplies power to the display device in a wireless manner;
   a detector for detecting whether a first connector of the power supply device is connected to a second connector of the display device through the cable;
   an AC/DC port flow control (PFC) receiving power from an external power source through a power cable and selectively supplying power to the first power supplier or the second power supplier; and
   a processor configured to:
     control the second power supplier to supply power to the display device in the wireless manner and the first power supplier to stop supplying power to the display device in the wired manner, in a state in which the first connector and the second connector are disconnected by the cable; and
     control the first power supplier to supply power to the display device in the wired manner through the cable and the second power supplier to stop supplying power to the display device in the wireless manner, in a state in which the first connector and the second connector are connected by the cable,
   wherein the processor is configured to:
     based on the power supply device not being connected to an external power source or the display device failing to receive power from the power supply device in a wired or wireless manner, control a display panel of the display device to display a UI informing that a power source is not connected or a UI guiding connection to a power source, wherein the power supply device further comprises an auxiliary display formed on one surface of the power supply device, and the auxiliary display is configured to:

based on the power supply device not being connected to an external power source or the main body failing to receive power from the power supply device in a wired or wireless manner, display a warning icon.

2. The power supply device of claim 1, further comprising:

a closed loop line which, based on being connected to the cable, electronically connects two lines included in the cable, wherein the detector is configured to:

transmit a signal to one line between the two lines connected to the closed loop line according to control of the processor, and detect whether the display device and the power supply device are connected according to whether the transmitted signal is received through the other line of the cable.

3. The power supply device of claim 2, wherein the detector is configured to:

receive connection information through the closed loop line which is disposed on the display device and is electrically connected to the two lines included in the cable, and detect whether the display device and the power supply device are connected based on the received connection information.

4. The power supply device of claim 3, wherein the connection information includes a signal that the processor transmits to one line between the two lines connected to the closed loop line by controlling the detector and a signal received at the detector via the closed loop line, and the processor is configured to:

based on a signal received at the detector via the closed loop line being present, control the first and second power suppliers to supply power to the display device in the wired manner and stop supply of power in the wireless manner.

5. A display system comprising:

a main body on which a display panel is mounted;

a power supply device including a wired power supply module providing power to the main body in a wired manner and a wireless power supply module providing power to the main body in a wireless manner;

a first connector formed on the power supply device;

a second connector formed on the main body;

a detector for detecting whether the first connector of the power supply device is connected to the second connector of the main body through a cable;

an AC/DC port flow control (PFC) receiving power from an external power source through a power cable and selectively supplying power to the wired power supply module or the wireless power supply module; and a processor configured to:

control the wireless power supply module to supply power to the main body in the wireless manner and the wired power supply module to stop supplying power to the main body in the wired manner, in a state in which the first connector and the second connector are disconnected by the cable;

control the wired power supply module to supply power to the main body in the wired manner and the wireless power supply module to stop supplying power to the main body in the wireless manner, in a state in which the first connector and the second connector are connected by the cable, and wherein the processor is configured to:

based on the power supply device not being connected to an external power source or the main body failing to receive power from the power supply device in a wired or wireless manner, control the display panel to display a UI informing that a power source is not connected or a UI guiding connection to a power source, wherein the power supply device comprises an auxiliary display formed on one surface of the power supply device, and the auxiliary display is configured to:

based on the power supply device not being connected to an external power source or the main body failing to receive power from the power supply device in a wired or wireless manner, display a warning icon.

6. The display system of claim 5, wherein the second connector includes a closed loop line which, based on being connected to the cable, electrically connects two lines included in the cable, and the processor is configured to:

determine whether the main body and the power supply device are connected by controlling the detector to transmit a signal to one line between the two lines connected to the closed loop line, and detect whether the signal is received at the detector through the other line of the cable.

7. The display system of claim 5, wherein the power supply device comprises:

a speaker formed on one surface of the power supply device, and the processor is configured to:

based on the power supply device not being connected to an external power source or the main body failing to receive power from the power supply device in a wired or wireless manner, control the speaker to output a warning sound or a voice sound guiding connection to a power source.

8. The display system of claim 5, further comprising a reserve power supplier which is capable of, in a state in which the power supply device is not connected to the external power source, supplying power to the power supply device and the main body.

9. A power supply method for supplying power to a display system, the method comprising:

identifying whether a first connector of a display device and a second connector of a power supply device are connected through a cable;

based on identifying that the first connector and the second connector are disconnected by the cable, supplying power by the power supply device to the display device in a wireless manner and stop supplying power to the display device in the wired manner;

based on identifying that the first connector and the second connector are connected by the cable, supplying power by the power supply device to the display device in a wired manner and stop supplying power to the display device in the wireless manner, wherein the power supply device comprises an AC/DC power flow control (PFC) receiving power from an external power source through a power cable and selectively supplying power in the wired manner or in the wireless manner, wherein the power supply method further comprises:
  based on the power supply device not being connected to the external power source or the display device failing to receive power from the power supply device in a wired or wireless manner, control a display panel of the display device to display a UI informing that a power source is not connected or a UI guiding connection to a power source; and
wherein the power supply device comprises an auxiliary display formed on one surface of the power supply device, and the auxiliary display is configured to:
  based on the power supply device not being connected to an external power source or the main body failing to receive power from the power supply device in a wired or wireless manner, display a warning icon.

10. The power supply method of claim 9,
wherein the identifying comprises:
  transmitting a signal to a first line of the cable connected to a first terminal of a closed loop line disposed on the display device; and
  determining whether the signal was received through a second line of the cable connected to a second terminal of the closed loop line.

11. The power supply method claim 10, further comprising:
  after the identifying whether the signal was received,
    based on the signal not being received through the second line, displaying through a display panel a UI informing that connection to a power source was not performed or a UI guiding connection to a power source.

12. The power supply method claim 9, further comprising:
  prior to the supplying power to the display device in a wireless manner,
    identifying whether the power supply device is connected to an external power source by wire; and
    based on identifying that the power supply device is not connected to the external power source by wire, supplying power by a reserve power supplier to the power supply device and the display device.

* * * * *